UNITED STATES PATENT OFFICE.

ISAAC C. HART, OF CINCINNATI, OHIO, ASSIGNOR OF ONE-HALF TO WILLIAM GREY WADE, OF SAME PLACE.

PLASTERING COMPOUND.

SPECIFICATION forming part of Letters Patent No. 406,215, dated July 2, 1889.

Application filed March 20, 1889. Serial No. 304,040. (No specimens.)

*To all whom it may concern:*

Be it known that I, ISAAC C. HART, a citizen of the United States, and a resident of Cincinnati, in the county of Hamilton and State of Ohio, have invented certain new and useful Improvements in Plastering Compounds, of which the following is a specification.

My invention relates to a plastering compound for the inside finish of walls, ceilings, &c., to be used in place of the common plastering-mortar. Its object is to supply a cheap compound which can be quickly mixed for use, easily applied, and which will dry out quickly and present a smooth hard finish.

My compound is composed of equal parts, by measure, of clean fine sand, plaster-of-paris, asbestus, and lime. The lime is slaked, dried, and sifted. The asbestus may be either the fiber or the ground or finely-pulverized material. I prefer the latter because it is cheaper. The ingredients are thoroughly mixed in the dry state and put up for sale in sacks or barrels. The compound is prepared for use by adding sufficient water to bring it to the proper consistency, and it is applied as the ordinary plastering or mortar; but one coat of this compound is applied for all ordinary purposes, and this need be only about half the thickness of the common plastering-mortar, as in drying it becomes very hard and compact.

The compound, after it is applied, will dry thoroughly in less than one day, thus avoiding the usual delay as well as the uncleanliness accompanying the ordinary work of plastering.

I have given above what I believe to be the best proportions for a plastering compound; but as these may be varied without departing from the spirit or scope of my invention I do not wish to be strictly limited to the exact proportions named. For instance, a good compound may be made by using two parts each of sand and asbestus and three parts each of plaster-of-paris and lime.

My compound is also valuable for deadening floors, as it is practically fire-proof.

I claim—

1. A plastering compound composed of sand, plaster-of-paris, lime, and asbestus, prepared substantially as hereinbefore set forth.

2. The hereinbefore-described plastering compound, consisting of equal parts, by measure, of sand, plaster-of-paris, lime, and asbestus mixed together in a dry state, substantially as and for the purpose set forth.

ISAAC C. HART.

Witnesses:
   GEO. J. MURRAY,
   W. G. WADE.